Jan. 23, 1962 W. STELZER 3,018,139
PRESSURE CONTROL MECHANISM FOR VEHICLE BRAKES
Filed April 1, 1958
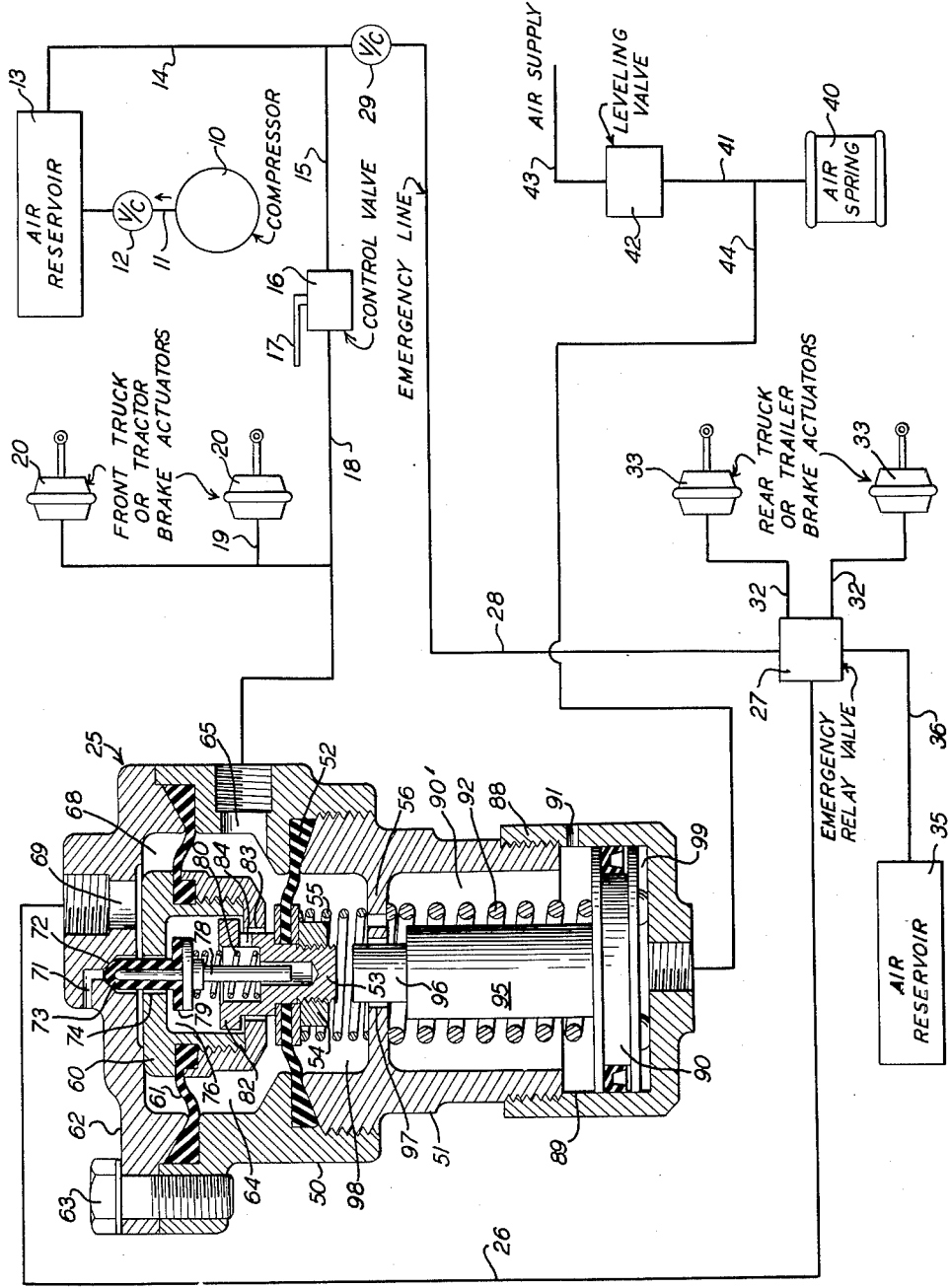
INVENTOR.
WILLIAM STELZER
BY
John V. Phillips
ATTORNEY United States Patent Office 3,018,139
Patented Jan. 23, 1962

3,018,139
PRESSURE CONTROL MECHANISM FOR VEHICLE BRAKES
William Stelzer, Bloomfield Hills, Mich., assignor to Kelsey-Hayes Company, Detroit, Mich., a corporation of Delaware
Filed Apr. 1, 1958, Ser. No. 725,587
13 Claims. (Cl. 303—60)

This invention relates to a pressure control mechanism for vehicle brakes, and particularly to such a mechanism adapted especially for use with trucks and tractor-drawn trailers.

It is well known that in the operation of truck and trailer brakes, particularly where super-atmospheric pressure is used as the source of power, excessive braking is applied to the rear truck or trailer brakes when the truck or trailer is traveling light or carrying relatively light loads. It has been necessary to provide adequate braking to take care of heavy load conditions, and it is this fact which renders the braking excessive under light load conditions.

An important object of the present invention is to provide a control mechanism which operates automatically to provide substantially heavy braking for rear truck wheels or trailer wheels when the vehicle is relatively heavily loaded, and to reduce the available differential braking pressures for such vehicles when the latter are traveling relatively lightly loaded.

A further object is to provide such a mechanism wherein a modulated action takes place automatically under intermediate load conditions to provide for heavier braking than when the vehicle is lightly loaded, but less than the maximum braking which is provided when the vehicle is heavily loaded.

A further object is to provide such a mechanism which is particularly adapted for use with super-atmospheric pressure operated brake actuators, particularly on trucks and trailers provided with air springs equipped with leveling valves, and to utilize the pressure in the air springs which varies according to the load conditions, for automatically determining the maximum pressure which can be supplied to the brake actuators.

Other objects and advantages of the invention will become apparent during the course of the following description.

In the drawing I have shown one embodiment of the invention. In this showing:

The figure is a diagrammatic representation of a tractor-trailer brake system, the automatic valve forming the principal subject matter of the present invention being shown in axial section.

Referring to the drawing, the numeral 10 designates a conventional compressor for generating the super-atmospheric pressure utilized for operating vehicle brakes. The compressor supplies air under pressure through a line 11, preferably provided with a check valve 12, to a conventional reservoir 13 having an outlet line 14. This line is connected by a branch 15 to a control valve 16 having an actuating handle or pedal 17. This control valve may be of any conventional type, either hand- or pedal-operated, and its operation is adapted to connect the line 15 to a line 18 which, when the control valve is in normal position, is connected to the atmosphere. The line 18 is connected by branches 19 to brake actuators 20, two of which are shown. The system as a whole shown in the drawing is a tractor-trailer brake system, but it will become apparent that the actuators 20 may be associated with the front brakes of a truck, or they may be actuators associated with a tractor adapted to haul a trailer.

The line 18 is connected to an automatic control valve mechanism indicated as a whole by the numeral 25, and from such mechanism, as further described below, a pressure supply line 26 extends to a conventional relay valve mechanism diagrammatically indicated by the numeral 27 and of any desired type. Preferably, the mechanism 27 is of the emergency relay valve type, well known in the art, and such mechanism is connected by a line 28 to the line 14, preferably with a check valve 29 arranged in the line 28. The emergency line 28 extends from the tractor to the trailer and, upon breakage of this line incident to a break-away of the trailer from the tractor, the line 28 will be opened to the atmosphere and the emergency relay valve 27 will operate to set the trailer brakes referred to below. Obviously, the emergency line 28 is normally connected to the air reservoir 13 whereby reservoir pressure is constantly maintained in the line 28.

From the emergency relay valve mechanism 27, lines 32 extend to the trailer brake actuators 33. The actuators 20 and 33 in this case are super-atmospheric pressure motors which are normally connected to the atmosphere. The connection of the motors 20 to the atmosphere is through line 18 and through the control valve 16 when the latter is in normal position. The connection of the actuators 33 to the atmosphere is through the relay valve 27 in the normal functioning thereof.

It will become apparent that the actuators 33 may be the rear brake actuators of a truck, in which case the line 26 would be directly connected to the actuators 33 without the use of the relay valve 27. This valve is used in tractor-trailer installations, in which case the trailer is provided with an air reservoir 35 connected to the valve mechanism 27 as at 36.

As previously stated, the present mechanism is particularly adapted for use on heavy vehicles provided with air springs and leveling valves therefor, this type of suspension means coming more and more into common use on heavy vehicles such as trucks, buses and tractor-drawn trailers. In the present instance, the axle (not shown) associated with the actuators 33 is provided with air springs, one of which is shown diagrammatically and is indicated by the numeral 40. Such air spring is connected by a line 41 to a leveling valve 42 of any desired type, for example, the leveling valve shown in my copending application Serial No. 720,153, filed March 10, 1958. The leveling valve is connected to a suitable source of air pressure supply through a line 43. The leveling valve functions automatically to control the mean pressure in the air springs in accordance with the loading of the vehicle. Such pressure is controlled through line 41 into which is tapped one end of a line 44 leading to the automatic valve mechanism 25 and connected thereto as described below.

The valve mechanism 25 comprises upper and lower body members 50 and 51 threaded together as shown and clamping therebetween the peripheral portion of a diaphragm 52. The axial portion of this diaphragm is clamped with respect to a stud 53 by a nut 54, and a coil spring 55, engaging at its upper end against the diaphragm structure and at its lower end against a wall 56 formed in the body member 51, biases the diaphragm 52 and stud 53 to their upper normal positions shown in the drawing.

A two-part cage 60 clamps between the parts thereof the inner peripheral portion of a diaphragm 61. The outer peripheral portion of this diaphragm is clamped between the body member 50 and a cap 62 fixed to the body 50 as at 63. The diaphragms 52 and 61 define therebetween a chamber 64 communicating through a port 65 with the line 18. This line, as previously stated, is open to the atmosphere through the control valve 16, and accordingly the chamber 64 is normally connected to the atmosphere.

The cap 62 and diaphragm 61 form therebetween a chamber 68 connected through a port 69 to the line 26 described above. The chamber 68 is adapted to communicate with the atmosphere through a port 71 having a valve seat 72 normally engaged by a resilient valve 73 as shown in the drawing.

The valve 73 is vertically elongated and projects through an opening 74 in the upper member of the cage 60. The opening 74 is larger in diameter than the valve 73 and accordingly the chamber 68 normally communicates with a chamber 76 formed in the cage 60.

The valve 73 is carried by the upper end of a stem 78 and carries an integral flange 79 normally disengaged from the top surface of the chamber 76 and engageable therewith under conditions to be described to close the chamber 76 to the opening 74. A spring 80 biases the valve 73 and its valve flange 79 upwardly.

The stud 53 is provided at its upper end with an annular flange 82 adapted to limit downward movement of the stud 53 relative to the cage 60. The bottom part of the cage 60 is provided with an opening 83 larger than the portion of the stud extending therethrough, and this opening communicates with the chamber 76 through a port 84 through the stud 53. It will be apparent, therefore, that the chamber 64 is always in communication with the chamber 76.

The lower end of the body member 51 has threaded connected with a cap 88. This cap, below the lower end of the body member 51, is formed as a cylinder 89 in which is vertically movable a sealed piston 90. The upper end of the cylinder 89 and the lower internal portion of the body member 51 form a chamber 90' open to the atmosphere as at 91. In the chamber 90' is arranged a spring 92 engaging the piston 90 to bias it to its lower normal position shown.

The piston 90 carries a vertically extending rod 95 the upper end of which is reduced as at 96 and extends through an opening 97 of larger diameter than the stem portion 96. The space in which the spring 55 is arranged forms an atmospheric chamber 98 in fixed communication through the opening 97 with the chamber 90. Since the chamber 90 is always open to the atmosphere through the port 91, it will be apparent that atmospheric pressure is maintained at all times in the chambers 90 and 98.

The space beneath the piston 90 forms a chamber 99 and one end of the line 44 communicates with such chamber so that the pressure in the chamber 99 changes with increases and decreases in pressure in the air spring provided by the functioning of the leveling valve 42.

*Operation*

Assuming that the vehicle is traveling relatively light, the air spring pressure reflected in the chamber 99 through line 44 is relatively low and the spring 92 will maintain the piston 90 in its lower position as shown. In the released position of the control valve 16, atmospheric pressure will be present in the chambers 64 and 68, these chambers communicating with each other under normal conditions in the manner described above. The chambers 90 and 98 also will be at atmospheric pressure as they are under all conditions, since they communicate with the atmosphere through port 91. Operation of the control valve handle or pedal 17 disconnects the line 18 from the atmosphere and connects it to the pressure line 15, and the actuators 20 will be subjected to superatmospheric pressure under the control of the valve 16 to apply the brakes associated with such actuators. The actuators, as stated, will be those associated with the front brakes of a truck or with the brakes of a tractor associated with a trailer.

When the line 18 is thus supplied with air under pressure, air will flow through port 65 into the chamber 64, thence through openings 83 and 84 into the chamber 76, and then through opening 74 into the chamber 68 from which the air pressure will be supplied through line 26 to the relay valve mechanism 27. This valve functions conventionally to disconnect the lines 32 from the atmosphere and connect them to the line 36 whereby pressure will be supplied to the actuators 33 to operate the rear truck brakes or the brakes of a trailer. As previously stated, the emergency relay valve 27 is employed when the system is used on a tractor-trailer, but when the system is used on a truck, the valve mechanism 27 is eliminated and the actuators 33, associated with the rear truck brakes, are directly supplied with pressure from the line 26. In either case, the actuators 33 will be energized to apply the associated brakes.

Under the light load conditions being considered, the piston 90 will be in its lowermost position and the movable parts comprising the stud 53, diaphragms 52 and 61, etc. are free to move downwardly from their normal positions. During initial brake application, the pressure from the line 18 is supplied to the line 26 without reduction, but as the pressure builds up due to increasing pedal effort in operating the valve 16, the spring 55 yields to pressure in the chamber 64, whereupon the flange 82 engages the adjacent bottom wall of the lower section of the cage 60 to pull this cage downwardly together with the diaphragm 61. This operation moves the top wall of the cage 60 into engagement with the valve flange 79, thus closing the chamber 76 to the chamber 68. At this point, no further air pressure will be admitted from the chamber 76 to the chamber 68 and to the line 26. The spring 55 serves as a transition spring and preferably yields, under the conditions being considered, approximately at the point where the brake shoes have expanded to contact the brake drums or have already produced a slight brake application.

Any further increase in pressure in the line 18 will not be reflected in a corresponding increase in pressure in the line 26, there being a pressure reduction in proportion to the effective area of the diaphragm 61 versus the same area less the effective area of the diaphragm 52. The two diaphragms, moving in unison, act to modulate the air pressure in the chamber 68 to be proportionately reduced relative to pressure in the line 18. Thus, if pressure in the chamber 68 is too high, the diaphragms move downwardly and thereby crack the valve 73 to bleed pressure from the chamber 68 to the atmosphere through port 71. If the pressure in the chamber 68 is too low, the diaphragms move upwardly to crack the valve flange 79 and admit more pressure from the chamber 76 through openings 74 into the chamber 68. The spring 80 serves to provide stability of the elements in the lap positions of the two portions of the valve 73 when the port 71 and opening 74 are closed.

Moreover, the closing of the valve 79 does not act to cut off communication between the chambers 64 and 68 regardless of increased pressures in the chamber 64. If, after the closing of the valve 79 as described above, the operator admits greater pressure into the line 18 for a heavier application of the front truck or tractor brake actuators, the same increase in pressure will occur in the chamber 64. Pressures above and below the diaphragm 61 will then be unbalanced, the valve 79 being closed, and the pressure acting upwardly on the diaphragm 61 will overcome pressure acting downwardly on the diaphragm 52, thus moving the cage 60 upwardly to "crack" the valve 79 and admit additional pressure into the chamber 68. Thus, before the point is reached where the valve 79 initially closes, operation of the control valve will supply the same pressure to the lines 26 and 18. Beyond the point at which the valve 79 initially closes, proportionate increases in pressure will occur in the chamber 68 and consequently in the line 26, the valve mechanism 25 acting to reduce application of the trailer brakes relative to the degree of application of the truck brakes, but increasing application of the trailer brakes in a definite ratio with respect to application of the truck or trailer brakes.

Assuming that the truck or trailer is heavily loaded, the leveling valve 42 will supply greater load supporting pressure to the air spring or springs, and such pressure will be communciated to the chamber 99 to move the piston 90 upwardly against the loading of the spring 92. Under such conditions, the shoulder at the upper end of the piston rod portion 95 will engage the bottom surface of the wall 56, and the upper piston rod portion 96 will engage the bottom of the stud 53 to prevent downward movement of such element. Thus the diaphragm 52 is prevented from moving downwardly and no downward movement will be transmitted to the cage 60. This cage thus remains in its uppermost position with the valve 73 closed and the valve 79 open. Accordingly, full line pressure can be transmitted from the line 18 through chambers 64 and 76 and through opening 74 to the chamber 68. Thus a substantially higher maximum braking pressure is rendered available for operation of the actuators 33.

If the vehicle is loaded to an intermediate extent, the spring 92 will be compressed and the upper piston rod portion 96 will abut the stud 53. Under such conditions, pressure in the chamber 99 will not be sufficient to overcome all differential pressures tending to move the diaphragm assemblies downwardly. Thus the pressure in the chamber 99 will not be sufficient to overpower pressures acting downwardly on the diaphragm 52 in addition to compressing the spring 92. Thus the ratio of pressures in the lines 18 and 26 is changed. Pressure in the chamber 68 will be reduced relative to pressure in the line 18, but will be greater than the pressure would be with a light load as described above.

Release of the control valve 16 opens the line 18 to the atmosphere, thus relieving pressures throughout the system. Pressure in the chamber 68 will then move the cage 60 downwardly to open the valve 73 and connect the chamber 68 to the atmosphere. This action restores the emergency valve 27 to its normal condition, the actuators 33 being opened to the atmosphere. The valve mechanism 25 thus acts as a quick release for the rear truck or trailer brake actuators.

From the foregoing it will be apparent that the present system is highly efficient for controlling available maximum pressures for operating the actuators of the rear brakes of a truck or the brakes of a tractor-drawn trailer. The mechanism is so designed as to provide for maximum limited pressure available when the vehicle is traveling light, while maximum pressures in the air reservoir 13 can be supplied to the actuators 33 under heavy load conditions. The mechanism also functions with a modulating action to provide for intermediate pressure reductions between the lines 18 and 26 in accordance with medium or intermediate vehicle load conditions.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A control valve mechanism comprising a casing, first and second diaphragm structures in said casing, said first diaphragm structure forming with said casing a first chamber for connection with a pressure line, said first diaphragm structure forming with said second diaphragm structure a second chamber for connection with a pressure control valve, said first diaphragm structure having a passage therethrough connecting said chambers, a normally open valve controlling said passage, said first diaphragm structure having lost motion connection with said second diaphragm structure whereby the admission of pressure into said second chamber effects movement of both of said diaphragm structures, resilient means opposing such movement of said second diaphragm structure, said first diaphragm structure being engageable with said normally open valve to close it and close communication between said chambers upon said movement of said diaphragm structures to limit pressure in said first chamber, and means for preventing said movement of said second diaphragm structure to prevent closing of said normally open valve to thus maintain communication between said chambers to maintain equal pressures therein.

2. A mechanism according to claim 1 provided with a valve connected to be operated by movement of said first diaphragm structure to a predetermined extent for connecting said first chamber to the atmosphere to prevent building up of pressure in said first chamber above a predetermined point.

3. A mechanism according to claim 1 wherein said means for preventing movement of said second diaphragm structure comprises an element in said casing having a normal position spaced from said second diaphragm structure, and means for moving said element into engagement with said second diaphragm structure to prevent movement thereof.

4. A mechanism according to claim 1 provided with a valve connected to be operated by movement of said second diaphragm structure to a predetermined extent for connecting said first chamber to the atmosphere to prevent the building-up of pressure in said first chamber above a predetermined point, said means for preventing movement of said second diaphragm structure comprising an element normally spaced from said second diaphragm structure, and means for moving said element into engagement with said second diaphragm structure to prevent movement thereof.

5. A control valve mechanism comprising a casing, a first pressure responsive means forming with one end of said casing a first chamber for connection with a pressure line, a second pressure responsive means forming with said casing and with said first pressure responsive means a second chamber for connection with a control valve for controlling the supply of pressure to said second chamber, said first pressure responsive means having a passage therethrough connecting said chambers, a normally open valve controlling said passage, said second pressure responsive means being subject to and movable by an increase in pressure in said second chamber to a predetermined point and having lost motion connection with said first pressure responsive means to move it to close said normally open valve, and resilient means opposing such movement of said second pressure responsive means, said first pressure responsive means being subject to pressure in said second chamber to be operated when such pressure increases above said predetermined point for moving said first pressure responsive means to effect partial opening of said valve for admitting pressure from said second chamber to said first chamber.

6. A control valve mechanism comprising a casing, a first diaphragm structure forming with one end of said casing a first pressure chamber for connection with a pressure line and having a passage therethrough one end of which forms a valve seat, a normally open valve engageable with said seat, said valve and said seat forming a pair of valve elements relatively movable to close said passage, a second diaphragm structure forming with said casing and with said first diaphragm structure a second chamber for connection with a control valve for controlling the supply of pressure to said second chamber, said second diaphragm structure having lost motion connection with one of said valve elements whereby an increase in pressure in said second chamber to a predetermined point relatively moves said valve elements to close said passage, and resilient means opposing such movement of said second diaphragm structure, said first diaphragm structure acting in opposition to said second diaphragm structure to be movable by pressure in said second chamber above said predetermined point to reverse the relative movement of said valve elements to partially open said passage and admit pressure from said second chamber to said first chamber.

7. A mechanism according to claim 6 provided with a normally closed atmospheric valve controlling communication between said first chamber and the atmosphere and having connection with said first diaphragm structure, said first diaphragm structure being exposed to pressure in said first chamber to be moved thereby when said normally open valve is closed and pressure in said first chamber is above a predetermined point relative to pressure in said second chamber for opening said atmospheric valve.

8. A mechanism according to claim 6 provided with force applying means comprising an element arranged in the path of travel of said second pressure responsive means and normally disengaged therefrom, and means for variably controlling the force applied to said second pressure responsive means by said force applying means to predetermine the pressure in said second chamber effective for moving said second pressure responsive means to close said normally open valve.

9. A mechanism according to claim 6 wherein said first pressure responsive means comprises a diaphragm and a cage connected thereto, said passage extending through said cage, said normally open valve being arranged within said cage and normally spaced from said seat, said second pressure responsive means having lost motion connection with said cage to move the latter to engage said seat with said normally open valve when pressure in said second chamber increases to said predetermined point.

10. A mechanism according to claim 9 wherein said casing is provided with an atmospheric passage communicating with said first chamber, and an atmospheric valve normally closing said passage and connected to said normally open valve, said first pressure responsive means being exposed to pressure in said first chamber to be moved thereby when said seat engages said normally open valve to open said atmospheric valve to lower pressure in said first chamber when such pressure increases above a predetermined value relative to pressure in said second chamber.

11. In a pressure control system, a casing, a first pressure responsive means forming with said casing a first chamber, a second pressure responsive means forming with said casing and with said first pressure responsive means a second chamber, a first pressure line communicating with said first chamber, a control line communicating at one end with said second chamber, a control valve connected to the other end of said control line and connected to a source of super-atmospheric pressure, a second pressure line connected to said control line between said control valve and said casing and connected to devices to be operated by pressure admitted to said control line by said control valve, said first pressure responsive means having a passage therethrough connecting said chambers, a normally open valve engageable with one end of said passage to close it, lost motion means connected between said first and second pressure responsive means whereby movement of said second pressure responsive means by a predetermined pressure in said second chamber moves said first pressure responsive means to engage said passage with said normally open valve to close it, and resilient means opposing such movement of said second pressure responsive means.

12. A pressure control system according to claim 11 wherein said casing is provided with an atmospheric passage for connecting said first chamber to the atmosphere, and an atmospheric valve carried by said normally open valve and normally closing said atmospheric passage, said first pressure responsive means being subject to pressure in said first chamber to open said atmospheric valve when pressure in said first chamber increases to a predetermined value relative to pressure in said second chamber.

13. A pressure control system according to claim 11 provided with means for applying variable forces to said second pressure responsive means to oppose movement thereof for closing said normally open valve to predetermine the pressure in said second chamber at which such valve will be closed.

References Cited in the file of this patent
UNITED STATES PATENTS

| | | |
|---|---|---|
| 1,525,627 | Thomas | Feb. 10, 1925 |
| 1,887,578 | Bush | Nov. 15, 1932 |
| 2,150,576 | Bell | Mar. 14, 1939 |
| 2,184,551 | Hewitt | Dec. 26, 1939 |
| 2,335,825 | Eaton et al. | Nov. 30, 1943 |
| 2,429,194 | Price | Oct. 14, 1947 |
| 2,807,338 | Jankauskas | Sept. 24, 1957 |